(12) United States Patent
Laine et al.

(10) Patent No.: US 8,059,123 B1
(45) Date of Patent: Nov. 15, 2011

(54) PARALLEL PROCESSING SYSTEM, METHOD, AND COMPUTER PROGRAM PRODUCT FOR POSTPONING THE EXECUTION OF PRIMITIVE INTERSECTION

(75) Inventors: Samuli M. Laine, Vantaa (FI); Timo O. Aila, Tuusula (FI)

(73) Assignee: NVIDIA Corporation, Santa Clara, CA (US)

( * ) Notice: Subject to any disclaimer, the term of this patent is extended or adjusted under 35 U.S.C. 154(b) by 973 days.

(21) Appl. No.: 11/956,137

(22) Filed: Dec. 13, 2007

(51) Int. Cl.
*G06T 15/50* (2011.01)
*G06T 17/00* (2006.01)
*G06T 15/00* (2011.01)
*G06F 15/80* (2006.01)
*G09G 5/00* (2006.01)

(52) U.S. Cl. ........ 345/426; 345/623; 345/505; 345/419; 345/424

(58) Field of Classification Search .................. 345/424, 345/426, 419, 505, 623
See application file for complete search history.

(56) References Cited

U.S. PATENT DOCUMENTS

| | | | | |
|---|---|---|---|---|
| 6,654,012 B1* | 11/2003 | Lauer et al. | ................... | 345/424 |
| 2010/0060637 A1* | 3/2010 | Shearer | ......................... | 345/426 |

OTHER PUBLICATIONS

Ingo Wald. *Realtime Ray Tracing and Interactive Global Illumination*. Ph.D. dissertation, Universität des Saarlandes, 2004. http://www.sci.utah. edu/~wald/Publications/2004/WaldPhD/download/phd.pdf.
G. Blelloch, 1990. *Vector Models for Data-Parallel Computing*. MIT Press, ISBN 0-262-02313-X, 1990. http://www.cs.cmu.edu/~guyb/papers/Ble90.pdf.
Thinking Machines Corp., 1990. *Connection Machine Model CM-2 Technical Summary*. Version 6.0, Nov. 1990.
V. Havran. "*Heuristic Ray Shooting Algorithms.*" Ph.D. thesis, Czech Technical University, Nov. 2000.
Johannes Günther, Stefan Popov, Hans-Peter Seidel, and Philipp Slusallek. "Realtime Ray Tracing on GPU with BVH-based Packet Traversal." Proceedings of the IEEE/Eurographics Symposium on Interactive Ray Tracing 2007, pp. 113-118. http://www.mpi-inf.mpg.de/~guenther/BVHonGPU/BVHonGPU.pdf.
Daniel Horn, Jeremy Sugerman, Mike Houston, Pat Hanrahan. "Interactive k-D Tree GPU Raytracing." Symposium on Interactive 3D Graphics and Games, 2007. http://graphics.stanford.edu/papers/i3dkdtree.
U.S. Appl. No. 11/940,782, filed Nov. 15, 2007.
U.S. Appl. No. 11/938,091, filed Nov. 9, 2007.
U.S. Appl. No. 11/927,099, filed Oct. 29, 2007.
Popov et al., "Stackless KD-Tree Traversal for High Perfoimance GPU Ray Tracing," Eurographics 2007, vol. 26 (2007), No. 3.
Sengupta et al., "Scan Primitives for GPU Computing," Proceedings of Graphics Hardware 2007, San Diego, CA, Aug. 4-5, 2007.
Harris et al., "Parallel Prefix Sum Scan with CUDA," to appear in *GPU Gems 3*, Hubert Nguyen, ed., Addison-Wesley, 2007.
Blelloch, "Prefix Sums and Their Applications," Carnegie Mellon University School of Computer Science, Technical Report CMU-CS-90-190, Nov. 1990.
U.S. Appl. No. 11/862,938, flied Sep. 27, 2007.

(Continued)

*Primary Examiner* — Hau Nguyen
(74) *Attorney, Agent, or Firm* — Zilka-Kotab, PC

(57) ABSTRACT

A system, method, and computer program product are provided for postponing the execution of primitive intersection. In operation, at, least one node traversal operation and at least one primitive intersection operation is executed, utilizing a parallel processing architecture. Additionally, the execution of the at least one primitive intersection operation is postponed.

25 Claims, 9 Drawing Sheets

OTHER PUBLICATIONS

D. Naishlos, J. Nuzman, C-W. Tseng, and U. Vishkin, 2001. Towards a first vertical prototyping of an extremely fine-grained parallel programming approach. In *Proc. 13th ACM Symposium on Parallel Algorithms and Architecture (SPAA 01)*, Jul. 2001, http://www.umiacs.umd.edu/users/vishkin/XMT/spaa01.pdf.

U.S. Appl. No. 11/942,608, filed Nov. 19, 2007.

S.-E. Yoon, P. Lindstrom, V. Pascucci, and D. Manocha. "Cache-oblivious mesh layouts." *ACM Transactions on Graphics*, Proc. SIGGRAPH 2005, 24(3), Jul. 2005.

V. Havran and J. Bittner. "Efficient sorting and searching in rendering algorithms." *Eurographics 2006 Tutorials*, Tutorial T4, Aug. 2006. http://moon.felk.cvut.cz/~havran/eg2006tut/tut4cg06.pdf.

C. Wächter and A. Keller. "Instant Ray Tracing: The Bounding Interval Hierarchy." In *Proc. Eurographics Symposium on Rendering Techniques*, Apr. 2006.

U.S. Appl. No. 11/874,093, filed Oct. 17, 2007.

I. Kamel and C. Faloutsos. "On Packing R-trees." In *Proc. 2nd Int'l Conf. on Information & Knowledge Management*, Nov. 1993.

V. Pascucci and R. Frank. "Global Static Indexing for Real-time Exploration of Very Large Regular Grids." In *Proc. Supercomputing 2001*, Nov. 2001.

U.S. Appl. No. 11/950,193, filed Dec. 4, 2007.
U.S. Appl. No. 11/958,240, filed Dec. 17, 2007.
U.S. Appl. No. 11/956,108, filed Dec. 13, 2007.
U.S. Appl. No. 11/956,060, filed Dec. 13, 2007.
U.S. Appl. No. 11/958,259, filed Dec. 17, 2007.

\* cited by examiner

PARALLEL PROCESSING SYSTEM, METHOD, AND COMPUTER PROGRAM PRODUCT FOR POSTPONING THE EXECUTION OF PRIMITIVE INTERSECTION

FIELD OF THE INVENTION

The present invention relates to parallel processing architectures, and more particularly to processing nodes in a data structure using a parallel processing architecture.

BACKGROUND

Processor cores of current graphics processing units (GPUs) are highly parallel multiprocessors that execute numerous threads concurrently. Furthermore, threads of such processors are often packed together into groups, called warps, which are executed in a single instruction multiple data (SIMD) fashion. At any one instant, all threads within a warp may be nominally applying precisely the same instruction, each to its own private data values. If the processing unit is executing an instruction that some threads do not want to execute (e.g. due to conditional statement, etc.), those threads are idle. This condition, known as divergence, should be carefully avoided as idling threads are unutilized, thus reducing total computational throughput.

Many applications, at some point, traverse a data structure (e.g. a search tree, etc.) in response to a query. In some cases, data records are stored only at the leaf nodes (e.g. nodes with no corresponding child nodes, etc.). The rest of the nodes in the search tree are called inner nodes. This restriction is common in B+trees used in database and file systems, as well as in ray tracing hierarchies in the context of ray tracing.

For example, given a ray in space, it is desirable to discover which (if any) object (e.g. a geometric primitive or a group of primitives) in a scene is first intersected by the ray. In some cases, these geometric primitives (e.g. points, lines, triangles, etc.) may be organized in a tree, such as a bounding volume hierarchy (BVH), k-dimensional (kd) tree, or a binary space partitioning (BSP) tree. After the geometric primitives are organized in such tree, ray tracing involves traversing the tree, searching, for the leaf node or nodes that are intersected by a given ray. When such leaf node or nodes are found, the ray may be intersected against the primitives contained by the node or nodes.

A tree structure may be organized so that also inner nodes may contain primitives. In this case, inner nodes differ from leaf nodes only in that they contain other nodes. The nodes in this kind of tree structure may be processed in the same order as in a tree structure that may only contain primitives in leaf nodes. However, the ray may be intersected against primitives in both inner and leaf nodes.

Furthermore, the geometric primitives may be organized in a grid structure that may be traversed for determining ray-node intersections. In this case, each grid cell has a list of primitives that at least partially overlap the cell. The list may be empty if no primitive overlaps the cell. The traversal of grid acceleration structure includes finding the cell that contains the ray origin and stepping from cell to adjacent cells along the ray. When a cell that contains primitives is encountered, the ray may be intersected against the primitives contained by the cell.

Regardless of the particular type of structure used for organizing the primitives, there are two basic operations that need to be executed during the tracing of a ray. The first operation is node traversal, which typically includes intersecting the ray against one, two, or another predetermined number of nodes and choosing the node to be considered next. By repeated application of a node traversal operation, node or nodes that may contain primitives that the ray intersects may be found. The second operation is primitive intersection, i.e. intersecting the ray against the primitives in a node found during traversal. The execution of a ray tracing algorithm includes repeated application of these two operations in some order.

When formulating ray tracing algorithms on a highly parallel architecture such as a GPU, it is important to determine how rays and traversal tests are assigned to the various parallel threads of execution included in the parallel architecture. In particular, it is important to design a system to minimize divergence due to different threads in a warp making different decisions.

Various prior art techniques provide ways which allow rays to traverse a data tree independently. As a result, each ray visits only the nodes it actually intersects, such that redundant work is avoided. At any given time in a SIMD architecture, however, the entire warp has to be executing node traversal or primitive intersection due to the SIMD execution. This causes execution type penalties. For example, if node traversal is chosen to be executed, the threads that currently require primitive intersection to be executed will have to remain idle.

In one prior art technique, each thread is used to execute node traversal until a node that contains primitives is found. The node traversal continues until every thread in a warp has either found such node or terminated. Then each thread processes all primitives in the node it has found. Primitive processing continues until every thread in a warp has either processed all primitives in its node or terminated. This process is repeated until a ray terminates. This technique, known as the "while-while" technique, wastes a lot of computation resources, because an entire warp of threads must wait until the "slowest" ray has found a node that contains primitives. Similarly, the entire warp has to wait until the node that contains most primitives has been processed. Such technique is very inefficient in the context of SIMD architectures.

An alternative technique is the "if-if" technique. Using this technique, all rays that are to execute node traversal operation are first processed and all rays that are to execute primitive intersection operation are subsequently processed, for each step. A lot of processing power is wasted, because this technique executes a node traversal and/or primitive intersection operation even when only a single thread calls for such processing. As a result, the expected SIMD utilization of this method is also inefficient.

There is thus a need for addressing these and/or other issues associated with the prior art.

SUMMARY

A system, method, and computer program product are provided for postponing the execution of primitive intersection. In operation, at least one node traversal operation and at least one primitive intersection operation is executed, utilizing a parallel processing architecture. Additionally, the execution of the at least one primitive intersection operation is postponed.

DETAILED DESCRIPTION

Figure 1:
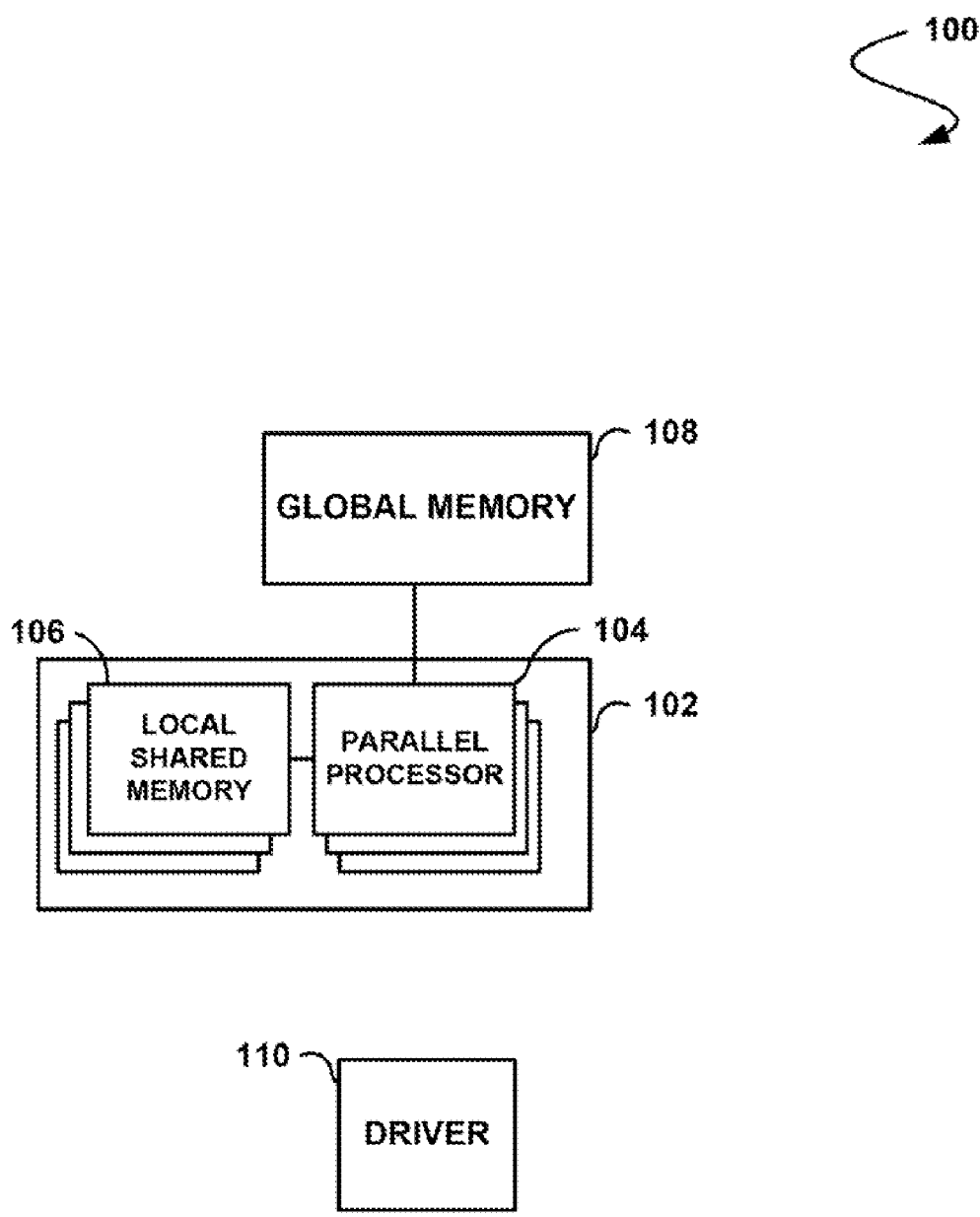
FIG. 1 shows a system including a parallel processing architecture, in accordance with one embodiment.

FIG. 1 shows a system NO including a parallel processing architecture, in accordance with one embodiment. As shown, a parallel processing architecture 102 is provided. Such parallel processing architecture includes a plurality of parallel processors 104. While not shown, such parallel processors may be capable of operating on a predetermined number of threads. To this end, each of the parallel processors may operate in parallel, while the corresponding threads may also operate in parallel.

In one embodiment, the parallel processing architecture may include one or more single instruction multiple data (SIMD) processing, elements. In such a system, the threads being executed by the processor are collected into groups such that at any instant in time all threads within a single group are executing precisely the same instruction but on potentially different data. In one embodiment, this group of threads operating in such fashion may be referred to as a "warp." Further, the predetermined number of threads in such a group may be referred to as the "warp size" of the corresponding, processor.

In another embodiment, the foregoing parallel processing architecture may include a graphics processor or any other integrated circuit equipped with graphics processing capabilities [e.g. in the form of a chipset, system-on-chip (SOC), core integrated with a CPU, discrete processor, etc.]. In still another embodiment, the foregoing parallel processing architecture may include a processor with one or more vector processing elements such as the Cell processor, referring to the Cell Broadband Engine microprocessor architecture jointly developed by Sony®, Toshiba®, and IBM®.

With continuing reference to FIG. 1, the parallel processing architecture may include local shared memory 106. Each of the parallel processors of the parallel processing architecture may read and/or write to its own local shared memory. This shared memory may consist of physically separate memories associated with each processor or it may consist of separately allocated regions of one or more memories shared amongst the processors. Further, in the illustrated embodiment, the shared memory may be embodied on an integrated circuit on which the processors of the parallel processing architecture are embodied.

Still yet, global memory 108 may be included, in use, such global memory is accessible to all the processors of the parallel processing architecture. As shown, such global memory may be embodied on an integrated circuit that is separate from the integrated circuit on which the processors of the aforementioned parallel processing architecture are embodied. While the parallel processing architecture is shown to be embodied on the various integrated circuits of FIG. 1 in a specific manner, it should be noted that the system components may or may not be embodied on the same integrated circuit, as desired.

Still yet, the present system of FIG. 1 may further include a driver 110 for controlling the parallel processing architecture, as desired. In one embodiment, the driver may include a library, for facilitating such control. For example, such library may include a library call that may instantiate the functionality set forth herein.

Further, in another embodiment, the driver may be capable of providing general computational capabilities utilizing the parallel processing architecture (e.g. a graphics processor, etc.). An example of such a driver may be provided in conjunction with the CUDA™ framework provided by NVIDIA Corporation.

In one embodiment, the driver may be used to control art operation of the parallel processing architecture for determining whether at least one thread in a parallel processing architecture has completed processing a ray tracing entity, and selecting an additional ray tracing entity from a group of ray tracing entities for processing by the parallel processing architecture, based on the determination. In another embodiment, the driver may be used to control an operation of the parallel processing architecture for determining whether a plurality of threads in a parallel processing architecture are to execute node traversal or primitive intersection, and executing node traversal or primitive intersection, based on the determination. In still another embodiment, the driver may be used to control an operation of the parallel processing architecture for executing node traversal or primitive intersection, utilizing a parallel processing architecture, and postponing the primitive intersection. Of course, the driver may be used to control an operation of the parallel processing, architecture for any combination of the above techniques. Still yet, embodiments are contemplated wherein the parallel processing architecture is capable of performing the foregoing functionality without the aforementioned control of the driver.

More illustrative information will now be set forth regarding various optional architectures and features with which the foregoing framework may or may not be implemented, per the desires of the user. It should be strongly noted that the following information is set torch for illustrative purposes and should not be construed as limiting in any manner. Any of the following features may be optionally incorporated with or without the exclusion of other features described.

Figure 2:
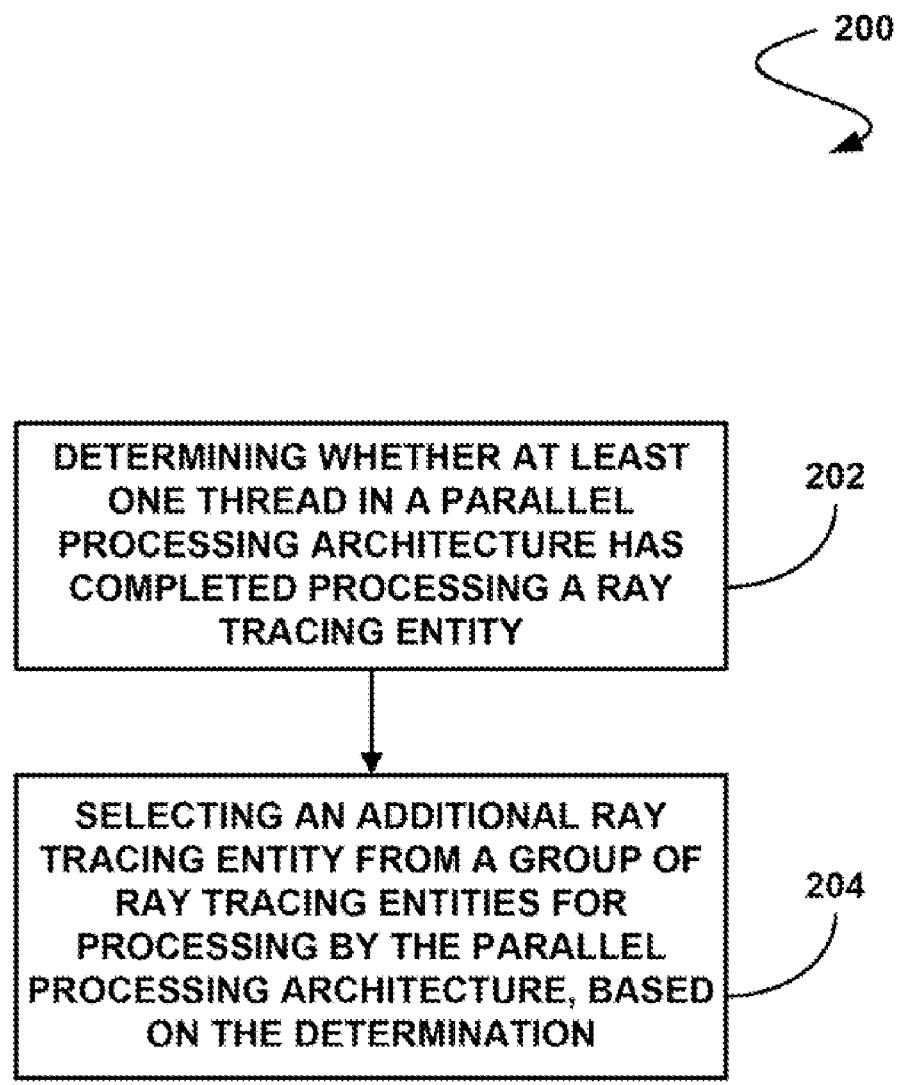
FIG. 2 shows a method for selecting a ray tracing entity from a group of ray tracing entities for processing by a parallel processing architecture, in accordance with one embodiment.

FIG. 2 shows a method 200 for selecting a ray tracing entity from a group of ray tracing entities for processing by a parallel processing architecture, in accordance with one embodiment. As an option, the present method 200 may be implemented in the context of the functionality and architecture of FIG. 1. Of course, however, the method 200 may be carried out in any desired environment. It should also be noted that the aforementioned definitions may apply during the present description.

As shown, it is determined whether at least one thread in a parallel processing architecture has completed processing a ray tracing entity. See operation 202. In the context of the present description, a ray tracing entity refers to any ray or group of rays, segment or group of segments, node or group of nodes, hounding volume (e.g. a bounding box, a bounding sphere, an axis-aligned hounding volume, etc.), object (e.g. a geometric primitive) or groups of objects, or any other entity used in the context of ray tracing. Additionally, in various embodiments, the parallel processing architecture may include a SIMD architecture, a graphics processor, a GPU, a CPU, etc.

As shown further, an additional ray tracing entity is selected from a group of ray tracing entities for processing by the parallel processing architecture, based on the determination. See operation 204. As an option, the determining and the selecting may be performed for ray tracing. In the context of the present description, ray tracing refers to a technique for determining the visibility of an object (e.g. a geometric primitive) or objects from a given point, such as, but not limited to an "eye" or "camera" point, by following a ray. In various embodiments, the objects may be organized in a tree-structured spatial hierarchy, such as a bounding volume hierarchy (BVH), a k-d tree (k-dimensional tree), a binary space partitioning (BSP) tree, etc., or in a data structure other than a tree-structure, such as a grid cell structure, etc.

As an option, the additional ray tracing entity may be selected from a hierarchical group of ray tracing entities. In one embodiment, the additional ray tracing entity may be selected from a single group of ray tracing entities, the single group of ray tracing entities being shared amongst a plurality of the threads. In another embodiment, the additional ray tracing, entity may be selected from one of a plurality of groups of ray tracing, entities, each group of ray tracing entities corresponding to one of a plurality of the threads.

Figure 3:
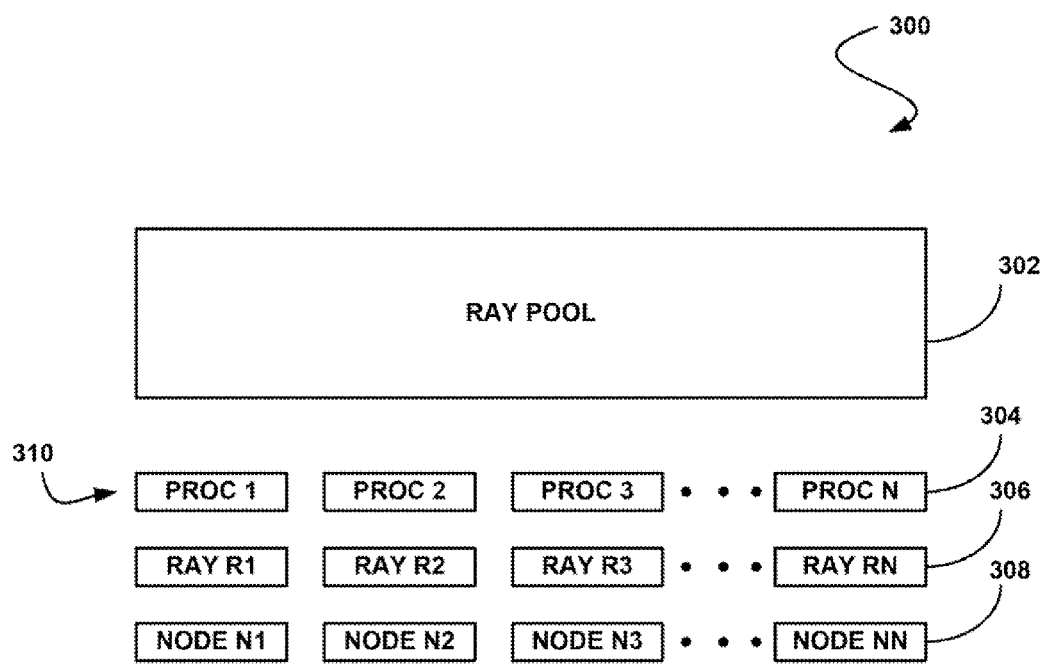
FIG. 3 shows a technique for selecting an additional ray tracing entity from a single group of ray tracing entities, in accordance with one embodiment.

FIG. 3 shows a technique 300 for selecting an additional ray tracing entity from a single group of ray tracing entities, in accordance with one embodiment. As an option, the present technique 300 may be implemented in the context of the functionality and architecture of FIGS. 1-2. Of course, however, the technique 300 may be carried out in any desired environment. Again, the aforementioned definitions may apply during the present description.

As shown, a ray 306 of a ray pool 302 and a node 308 are assigned to one thread 304 of a thread packet 310. Additionally, each thread packet 310 of a parallel processing architecture may be assigned one ray pool 302. Whenever a ray 306 terminates, the ray may be replaced with a new ray retrieved from the ray pool 302. Once the new rays have been retrieved, the processing of rays may continue.

Using the ray pool 302 allows termination penalties to be avoided until the ray pool 302 is exhausted. In one embodiment, a pool of one to four hundred rays per ray pool may be utilized. Of course, the ray pool 302 may include any number of rays. It should be noted that, although FIG. 3 is described in the context of one ray, each ray 306 may equally represent any ray tracing entity (e.g. groups of rays, bounding volumes, hierarchies of bounding volumes, objects, etc.).

In one embodiment, a plurality of subsets of the threads of a warp may retrieve new data from the ray pool 302 simultaneously. In order to be efficient, hardware support for 1-bit scan/prefix-sum may be utilized. More information regarding 1-bit scan/prefix-sum may be found in U.S. patent application Ser. No. 11/940,782 entitled SYSTEM, METHOD, AND COMPUTER PROGRAM PRODUCT FOR PERFORMING A SCAN OPERATION ON A SEQUENCE OF SINGLE-BIT VALUES USING A PARALLEL PROCESSOR ARCHITECTURE, filed on Nov. 15, 2007, which is incorporated herein by reference in its entirety.

Figure 4:
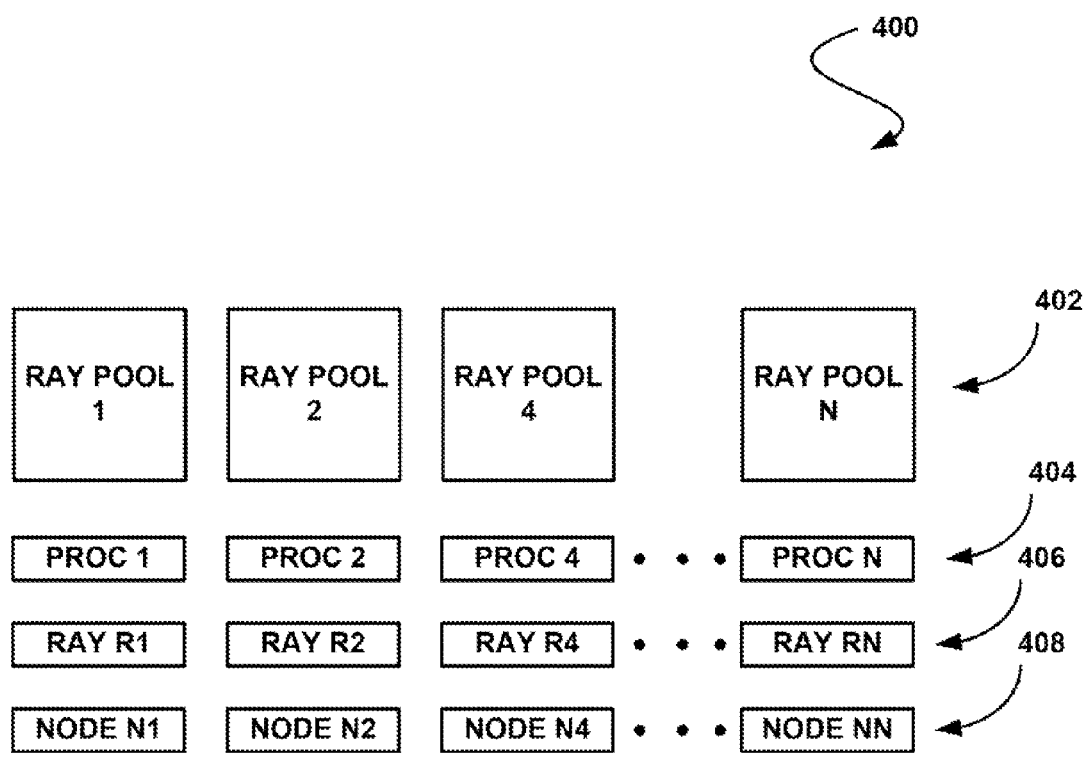
FIG. 4 shows a technique for selecting an additional ray tracing entity from one of a plurality of groups of ray tracing entities, in accordance with one embodiment.

FIG. 4 shows a technique 400 for selecting an additional ray tracing entity from one of a plurality of groups of ray tracing entities, in accordance with one embodiment. As an option, the present technique 400 may be implemented in the context of the functionality and architecture of FIGS. 1-3. Of course, however, the technique 400 may be carried out in any desired environment. Further, the aforementioned definitions may apply dining the present description.

As shown, one ray 406, one node 408, and one ray pool 402 are assigned to one thread 404 of a parallel processing architecture. In this case, when the ray 406 terminates, another ray may be retrieved from the corresponding ray pool 402 of the thread 404. In this way, inter-thread communication may be avoided. It should be noted that, although FIG. 4 is described in the context of one ray, each ray 406 may equally represent any ray tracing entity (e.g. groups of rays, bounding volumes, hierarchies of bounding volumes, objects, etc.).

In one embodiment, it may be determined whether one of the groups of ray pools 402 (i.e. groups of ray tracing entities) is empty. In this case, an additional ray tracing entity may be selected from a shared group of ray tracing entities shared amongst the plurality of threads 404, if it is determined that one of the groups of ray tracing entities 402 is empty. For example, the additional ray tracing entity may be selected from the shared group for load-balancing purposes.

As an option, a number of threads in the parallel processing architecture that have completed processing a corresponding ray tracing entity may be determined. In this case, an additional ray tracing entity may be conditionally selected from the group of ray tracing entities for processing by the parallel processing architecture, based on the number. Furthermore, the additional ray tracing entity may be selected from the group of ray tracing entities for processing by the parallel processing architecture, if the number is greater than a predetermined number.

It should be noted that the predetermined number may be any predetermined number depending on the application. For example, in one embodiment, the predetermined number may be at least five. Of course, the predetermined number may be any number depending on the application.

As an example, selecting the additional ray tracing entity may be deferred until M number of threads need data. Additionally, selecting the additional ray tracing entity may be deferred until after a certain number of node traversal and/or primitive intersection operations have been executed. For example, the retrieval of additional ray tracing entity may be deferred until ten such operations have been executed. Of course, these are only examples and should not be construed as limiting in any manner.

In various embodiments, the processing, of ray tracing entities using the parallel processing architecture may include the execution of node traversal, and/or primitive intersection. In these cases, the processing may be accomplished using a variety of methods, some of which are described below and may optionally be implemented in the context of the present description. Any of the following features may be optionally incorporated with or without the exclusion of other features described.

Figure 5:
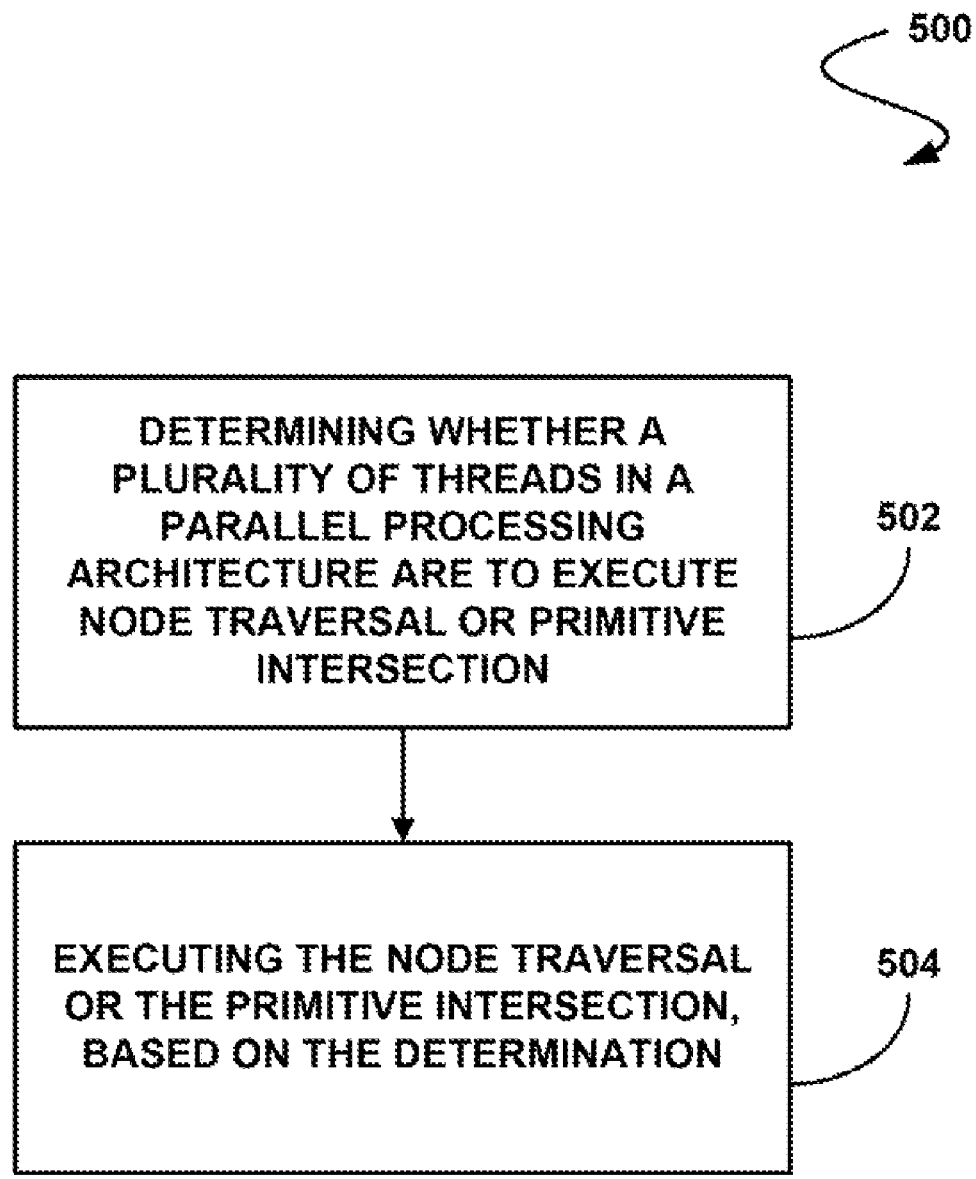
FIG. 5 shows a method for executing node traversal or primitive intersection using a parallel processing architecture, in accordance with one embodiment.

FIG. 5 shows a method 500 for executing node traversal or primitive intersection using a parallel processing architecture, in accordance with one embodiment. As an option, the present method 500 may be implemented in the context of the functionality and architecture of FIGS. 1-4. Of course, however, the method 500 may be carried out in any desired environment. It should also be noted that the aforementioned definitions may apply during the present description.

As shown, it is determined whether a plurality of threads in a parallel processing architecture are to execute node traversal or primitive intersection. See operation 502. In the context of the present description, node traversal refers to an operation that decides at which node or cell the search for nodes or cells that may contain primitives which a ray may intersect should continue. Further, primitive intersection refers to intersecting a ray against primitives in a node or cell found during traversal. In this case, ray tracing includes repeated application of these two operations in some order.

As shown further, node traversal or primitive intersection is executed, based on the determination. See operation 504. In one embodiment, the processing may include determining whether a ray or other ray tracing entity intersects a node or primitive.

In one embodiment, the determination may be made at each of a plurality of traversal operations. For example, each time a node in a tree is traversed or processed, it may be determined whether node traversal or primitive intersection is to be executed next. In one embodiment, only the node traversal or only the primitive intersection may utilize each of the threads, based on the determination.

In another embodiment, a first number of the threads may execute node traversal and a second number of the threads may execute primitive intersection. In this case, the first number and the second number may be compared and the node traversal or the primitive intersection may be executed, based on the comparison. As another option, only the node traversal may be executed utilizing each of the threads, if the first number is greater than the second number. As yet another option, only the primitive intersection may be executed utilizing each of the threads, if the first number is less than the second number.

In one embodiment, a weight may be applied to at least one of the first number and the second number of threads. In this case, the weight may be a function of an amount of processing that is required to execute the node traversal or the primitive intersection. In other words, a cost of processing may be considered as part of the function.

As an option, determining whether the threads are to execute node traversal or primitive intersection and the execution may be performed for ray tracing. For example, the ray tracing may include traversing a hierarchical data structure. Of course, the ray tracing is not limited to traversing a hierarchical data structure as any data structure may be traversed (e.g. a grid of cells, etc.). Further, each ray may equally represent any ray tracing entity (e.g. groups of rays, bounding volumes, hierarchies of bounding volumes, objects, etc.).

Figure 6:
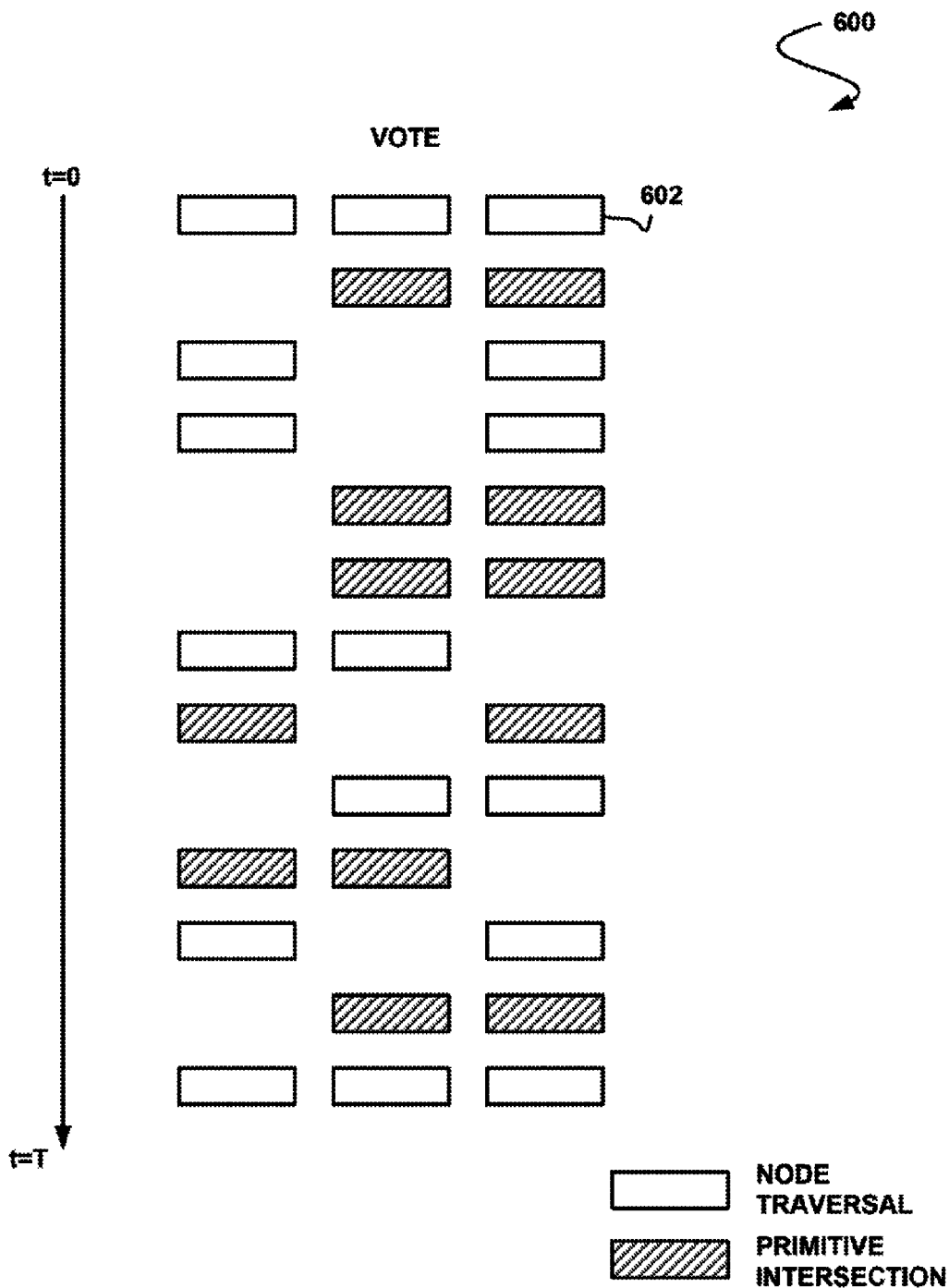
FIG. 6 shows an example illustrating one technique for determining whether to execute node traversal or primitive intersection, in accordance with one embodiment.

FIG. 6 shows an example 600 illustrating one technique for determining whether to execute node traversal or primitive intersection, in accordance with one embodiment. As an option, the example 600 may be viewed in the context of the functionality and architecture of FIGS. 1-5. Of course, however, the example 600 may be viewed in the context of any desired environment. Further, the aforementioned definitions may apply during the present description.

As shown, individual threads 602 in a SIMD architecture (a 3-wide SIMD architecture in this case) may "vote" whether to execute node traversal or primitive intersection. It should be noted that the voting may occur at each traversal step or after a certain number of nodes or primitives have been processed (e.g. after every second node or primitive, etc.). If it is determined that the number of threads desiring to execute node traversal is greater than the number of threads desiring to execute primitive intersection, node traversal may be executed. If it is determined that the number of threads desiring to execute node traversal is less than the number of threads desiring to execute primitive intersection, primitive intersection may be executed.

Various weighting schemes may also be applied to the two numbers to account for the relative execution cost of node traversal and primitive intersection, etc. Also, in one embodiment the numbers may be weighted according to the expected amount of work saved if a particular type of work is selected. In this way, at least 50% of non-terminated threads may provide useful work at every traversal step.

It should be noted that, in some cases, it may be desirable to postpone the execution of primitive intersection. In these cases, postponing the execution of primitive intersection may be accomplished using a variety of methods, some of which are described below and may optionally be implemented in the context of the present description. Any of the following features may be optionally incorporated with or without the exclusion of other features described.

Figure 7:
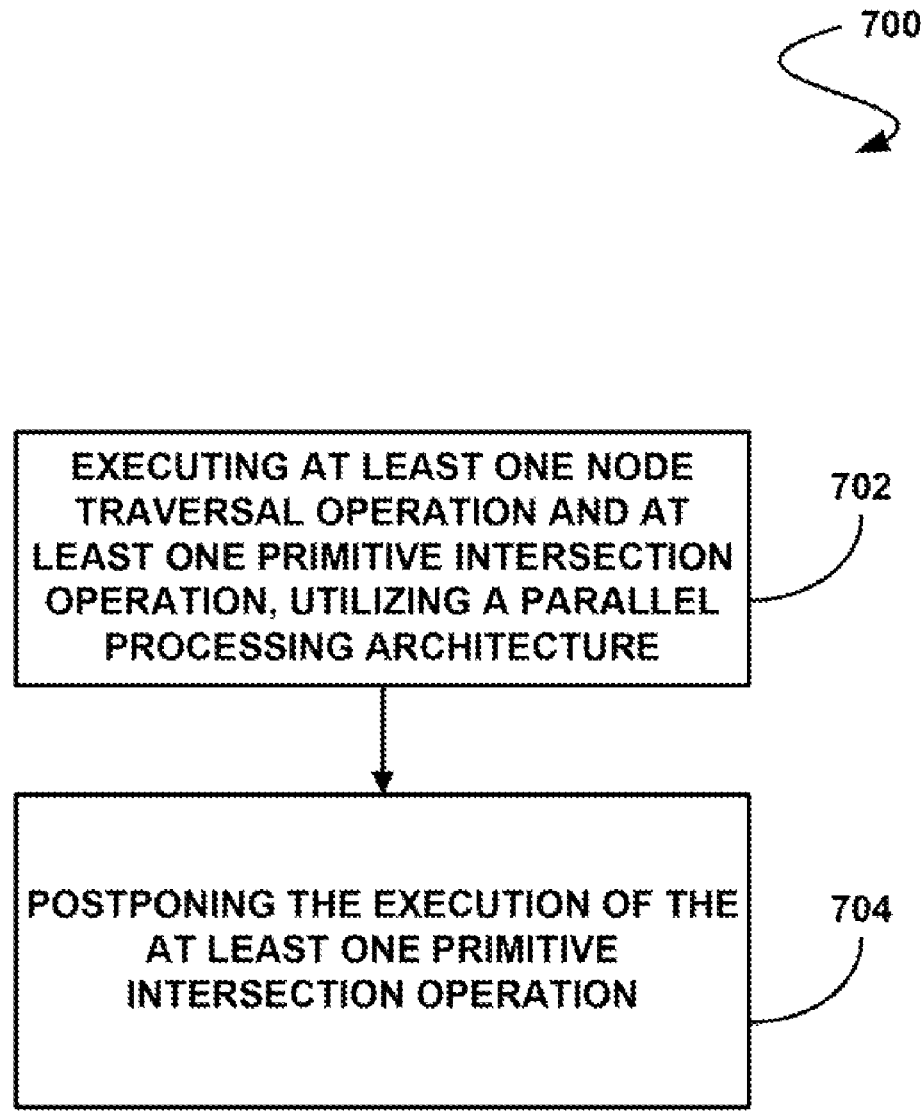
FIG. 7 shows a method for postponing the primitive intersection, in accordance with one embodiment.

FIG. 7 shows a method 700 for postponing the execution of primitive intersection in accordance with one embodiment. As an option, the present method 700 may be implemented in the context of the functionality and architecture of FIGS. 1-6. Of course, however, the method 700 may be carried out in any desired environment. It should also be noted that the aforementioned definitions may apply during the present description.

As shown, at least one node traversal operation and at least one primitive intersection operation is executed, utilizing a parallel processing architecture. See operation 702. Additionally, the execution of the at least one primitive intersection operation is postponed. See operation 704. In the context of the present description, a node traversal operation refers to any operation for performing a node traversal. Additionally, a primitive intersection operation refers to any operation for performing a primitive intersection.

As an option, the execution of the primitive intersection operation may be postponed utilizing a buffer. In one embodiment, the node traversal operation may be executed before execution of a plurality of associated primitive intersection operations. In the context of the present description, a primitive intersection operation refers to any test for determining whether a ray or segment intersects a geometric primitive or a plurality of geometric primitives.

Figure 8:
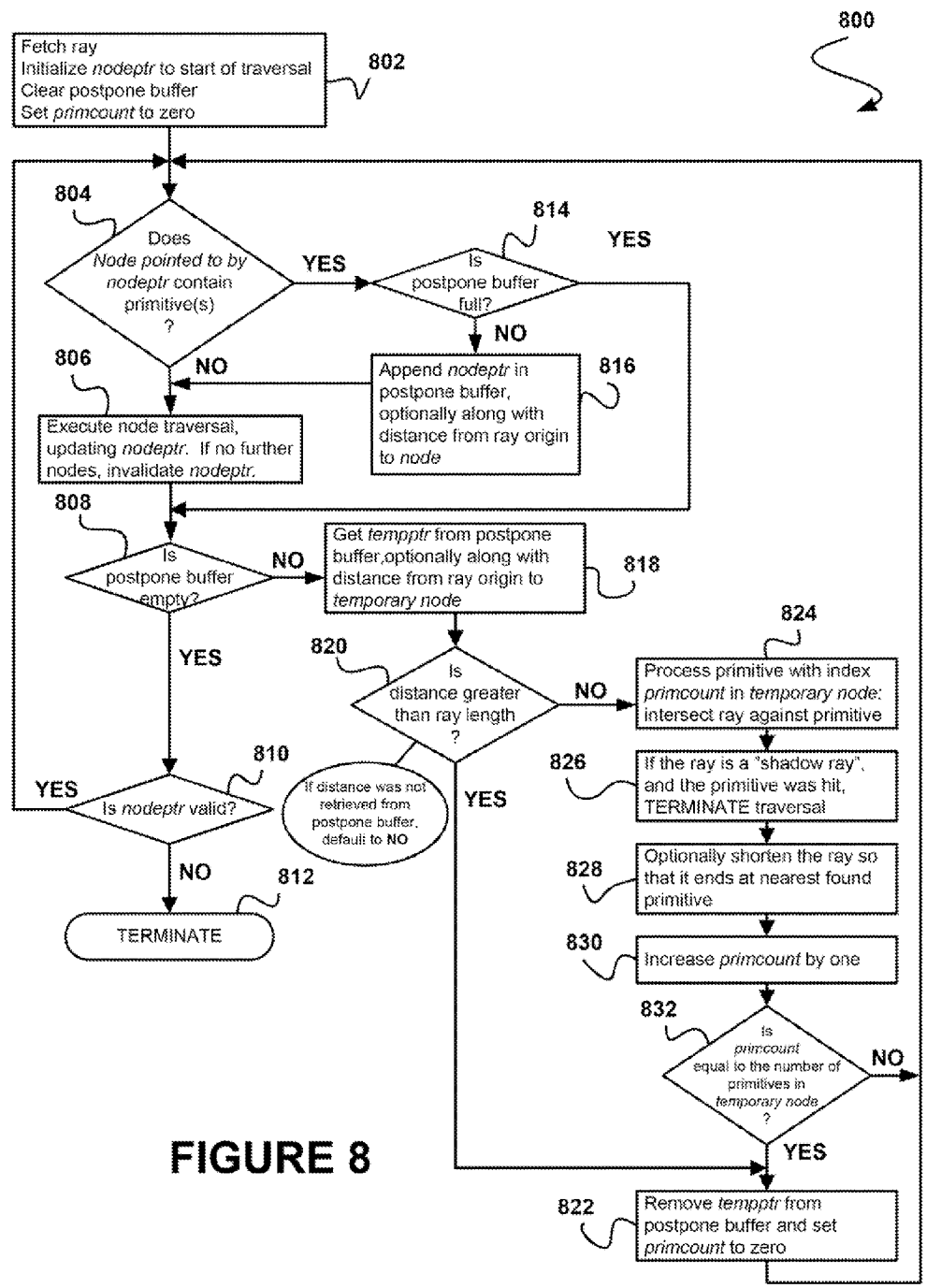
FIG. 8 shows a method for postponing the primitive intersection, in accordance with another embodiment.

FIG. 8 shows a method 800 for postponing the execution of primitive intersection, in accordance with another embodiment. As an option, the present method 800 may be implemented in the context of the functionality and architecture of FIGS. 1-7. Of course, however, the method 800 may be carried out in any desired environment. Again, the aforementioned definitions may apply during the present description.

As shown, a ray is retrieved, a node pointer is initialized to the beginning of a data structure traversal, a buffer (e.g. postpone buffer) is cleared, and a counter (e.g. primcount) is set to zero as pan of an initialization step. See operation 802. It is then determined whether the node pointed to by the node pointer contains at least one primitive. See operation 804.

If the node pointed to by the node pointer does not contain at least one primitive, a node traversal operation is executed and the node pointer is updated. Note that it is possible that the ray intersects no further nodes, and in this case, the node traversal operation invalidates the node pointer. See operation 806.

It is then determined whether the buffer is empty. See operation 808. If the buffer is empty, it is determined whether the node pointer is valid. See operation 810. If the node pointer is valid, the execution continues. If the node pointer is invalid, the execution is terminated. See operation 812.

If in operation 804 it is determined that the node pointed to by the node pointer contains a primitive, it is determined whether the buffer is full. See operation 814. If it is determined that the buffer is not full, the node pointer is appended in the buffer. Optionally, the distance from the origin of the ray being traversed to the node may be also appended in the buffer. See operation 816. After the buffer is updated, a node traversal operation is executed.

if in operation 808 it is determined that the buffer is not empty, a temporary node pointer (e.g. tempptr) is retrieved from the buffer. Optionally, the distance from the ray origin to the temporary node may also be retrieved. See operation 818. If distance from the ray origin to the temporary node was retrieved, it is then determined whether the distance is greater than the ray length. See operation 820. If it is determined that the distance to the temporary node is greater than the ray length, the temporary node pointer is removed from the buffer and the counter is set to zero. See operation 822.

If it is determined that the distance to the temporary node is not greater than (i.e. less than or equal to) the ray length, or the distance was not retrieved from buffer, a primitive in the temporary node with an index equal to the counter is processed and the ray is intersected with the primitive. See operation 824. If the ray is a "shadow ray" and the primitive was intersected, the traversal is terminated. Here, a "shadow ray" refers to a ray type that can exit immediately after any intersection is found. See operation 826. Additionally, the ray may be optionally shortened such that the ray ends at the nearest found primitive. See operation 828.

Further, the counter is increased by one. See operation 830. Once the counter is increased by one, it is determined whether the counter is equal to the number of primitives in the temporary node. See operation 832. If the counter is equal to the number of primitives in the temporary node, the temporary node pointer is then removed from the buffer and the counter is set to zero. If the counter is not equal to the number of primitives in the temporary node, operation 804 is then evaluated.

As noted above, the execution of node traversal and the postponing of the execution of primitive intersection may be performed for ray tracing. For example, the ray tracing may include traversing a hierarchical data structure. Of course, the ray tracing is not limited to traversing a hierarchical data structure as any data structure may be traversed (e.g. a grid of cells, etc.). Further, each ray may equally represent any ray tracing entity (e.g. groups of rays, bounding volumes, hierarchies of hounding volumes, objects, etc.).

Using the method 800, execution type penalties may be reduced by allowing a limited form of out-of-order execution of node traversal and primitive intersection. In particular, in a ray traversal process (e.g. a grid traversal, a BVH traversal, etc.) the execution of primitive intersections may be postponed in order to improve the SIMD utilization.

As an example, "T" may denote a node traversal operation and "P" may denote a primitive intersection (e.g. a ray-triangle, ray-sphere, frustum-triangle, etc.). A node may contain any amount of primitives (denoted as [PPP . . . ]). In this case, a SIMD architecture may not execute T and P at the same time. In this case, it may be assumed that the nodes intersected by rays 1 and 2 are as illustrated in Table 1.

TABLE 1

```
Ray 1:    T T T T[P P P P]T T ...
Ray 2:    T[P P P P]T T T T T ...
```

If the two rays illustrated in Table 1 are processed on a 2-wide SIMD, the execution appears as shown in Table 2 (assuming if-if scheduling). In this case, if-if scheduling refers to a technique where at each step the rays that execute node traversal are first processed, followed by all the rays that execute primitive intersection.

TABLE 2

```
Ray 1:   T    T       T    T[P    P       P    P]T  T  ...
Ray 2:   T[P       P       P    P]T    T          T  T  T  ...
```

As shown in Table 2, the SIMD utilization is not efficient because the two rays are almost completely out of sync. However, if the rays are allowed to postpone the execution of primitive intersections, the situation improves as shown in Table 3.

TABLE 3

```
Ray 1:   T    T       T    T[P T    P  T  P  P] ...
Ray 2:   T[P  T  P    T    P T P]T          T          ...
```

The postponing of the execution of primitive intersections allows continuing node traversal, even though primitive intersections have not been executed yet. In one embodiment, additional work may be caused when a primitive intersection that was postponed would have terminated a ray. In such case, the ray may traverse more nodes than necessary without affecting the correctness of results. As an option, processing of up to three nodes containing primitives may be postponed per ray. Of course, in various other embodiments, the processing of any number of nodes per ray may be postponed.

Figure 9:
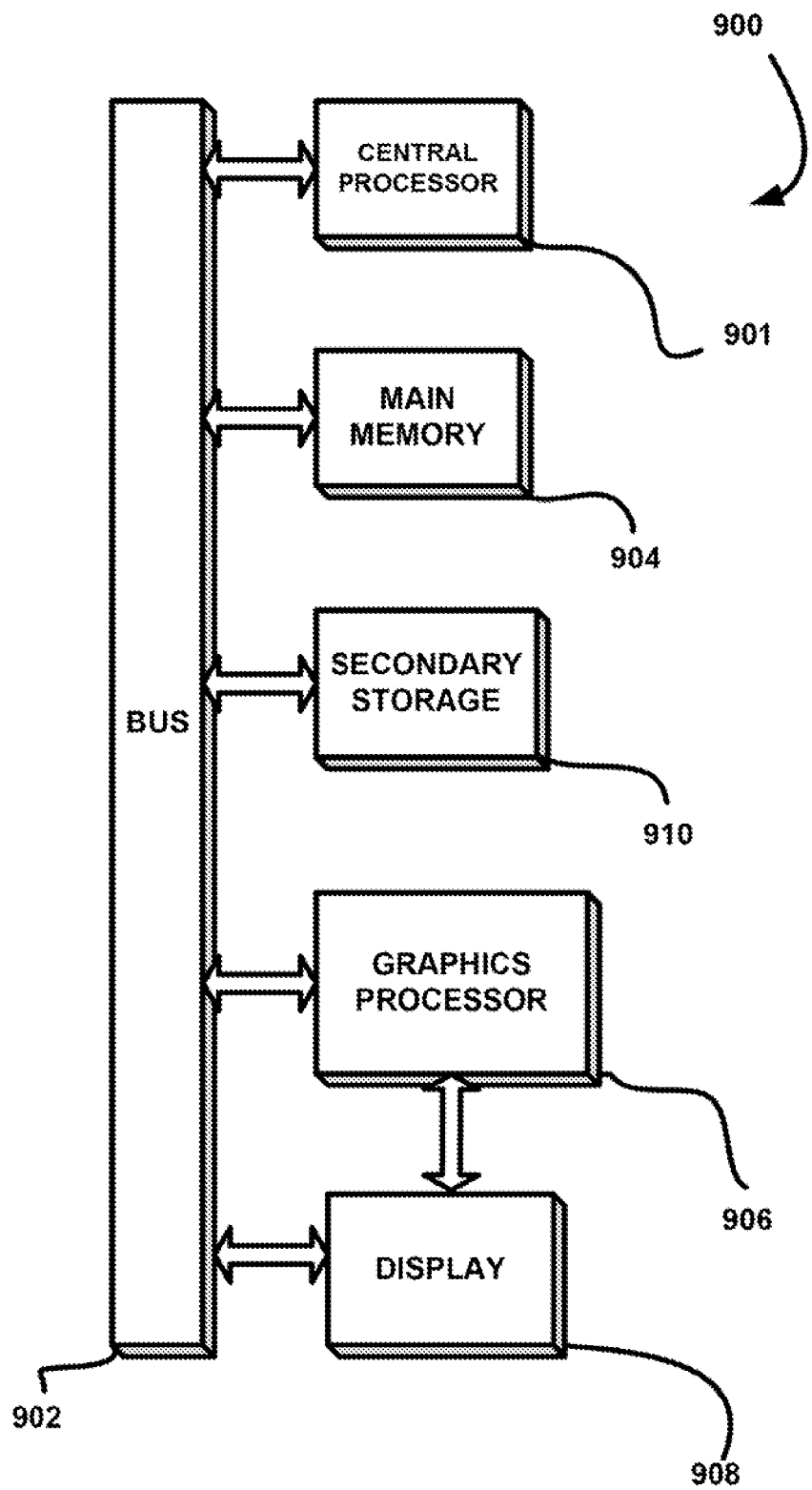
FIG. 9 illustrates an exemplary system in which the various architecture and/or functionality of the various previous embodiments may be implemented.

FIG. 9 illustrates an exemplary system 900 in which the various architecture and/or functionality of the various previous embodiments may be implemented. As shown, a system 900 is provided including at least one host processor 901 which is connected to a communication bus 902. The system 900 also includes a main memory 904. Control logic (software) and data are stored in the main memory 904 which may take the form of random access memory (RAM).

The system 900 also includes a graphics processor 906 and a display 908, i.e. a computer monitor. In one embodiment, the graphics processor 906 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 900 may also include a secondary storage 910. The secondary storage 910 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 904 and/or the secondary storage 910. Such computer programs, when executed, enable the system 900 to perform various functions. Memory 904, storage 910 and/or any other storage are possible examples of computer-readable media.

In one embodiment, the architecture and/or functionality of the various previous figures may be implemented in the context of the host processor 901, graphics processor 906, an integrated circuit (not shown) that is capable of at least a portion of the capabilities of both the host processor 901 and the graphics processor 906, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 900 may take the form of a desktop computer, lap-top computer, and/or any other type of logic. Still yet, the system 900 may take the form of various other devices including, but not limited to, a personal digital assistant (PDA) device, a mobile phone device, a television, etc.

Further, while not shown, the system 900 may be coupled to a network a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   executing at least one node traversal operation and at least one primitive intersection operation, utilizing a parallel processing architecture;
   postponing the execution of the at least one primitive intersection operation, utilizing a buffer;
   retrieving a node from the buffer; and
   determining whether a distance from an origin of a ray to the node is less than or equal to a length of the ray from the origin of the ray to an end of the ray;
   wherein the ray is intersected with a primitive contained in the node, if it is determined that the distance from the origin of the ray to the node is less than or equal to the length of the ray.

2. The method of claim 1, wherein the parallel processing architecture includes a single instruction multiple data architecture.

3. The method of claim 1, wherein the parallel processing architecture includes a graphics processor.

4. The method of claim 1, wherein the at least one node traversal operation is executed before execution of a plurality of associated primitive intersection operations.

5. The method of claim 1, further comprising determining whether the node contains primitives.

6. The method of claim 5, wherein the buffer is updated if it is determined that the node contains primitives.

7. The method of claim 5, wherein a data structure traversal is continued if it is determined that the node does not contain primitives.

8. The method of claim 1, wherein the determining and the executing is performed using a hierarchical data structure.

9. The method of claim 8, wherein the hierarchical data structure is a bounding volume hierarchy.

10. The method of claim 8, wherein the hierarchical data structure is a kd-tree.

11. The method of claim 1, wherein the determining and the executing is performed using a grid data structure.

12. A method, comprising:
   executing at least one node traversal operation and at least one primitive intersection operation, utilizing a parallel processing architecture;
   postponing the execution of the at one primitive intersection operation, utilizing a buffer;
   retrieving a node from the buffer; and
   determining whether a distance from an origin of a ray to the node is less than or equal to a length of the ray from the origin of the ray to an end of the ray;
   wherein the node is removed from the buffer, if it is determined that the distance from the origin of the ray to the node is greater than the length of the ray.

13. A method, comprising:
   executing at least one node traversal operation and at least one primitive intersection operation, utilizing a parallel processing architecture;
   postponing the execution of the at least one primitive intersection operation, utilizing a buffer;
   retrieving a node from the buffer; and
   determining whether a distance from an origin of a ray to the node is less than or equal to a length of the ray from the origin of the ray to an end of the ray;
   wherein the ray is shortened, if it is determined that the distance from the origin of the ray to the node is less than or equal to the length of the ray.

14. A computer program product embodied on a computer readable medium, comprising:
   computer code for executing at least one node traversal operation and at least one primitive intersection operation, utilizing a parallel processing architecture;
   computer code for postponing the execution of the at least one primitive intersection operation, utilizing a buffer;
   computer code for retrieving a node from the buffer; and
   computer code for determining whether a distance from an origin of a ray to the node is less than or equal to a length of the ray from the origin of the ray to an end of the ray;
   wherein the computer program product is operable such that the ray is intersected with a primitive contained in the node, if it is determined that the distance from the origin of the ray to the node is less than or equal to the length of the ray.

15. An apparatus, comprising:
   a parallel processing architecture for executing at least one node traversal operation and at least one primitive intersection operation, retrieving a node from a buffer, and determining whether a distance from an origin of a ray to the node is less than or equal to a length of the ray from the origin of the ray to an end of the ray; and
   a driver for postponing the execution of the at least one primitive intersection operation, utilizing the buffer;
   wherein the apparatus is operable such that the ray is intersected with a primitive contained in the node, if it is determined that the distance from the origin of the ray to the node is less than or equal to the length of the ray.

16. The apparatus of claim 15, wherein the parallel processing architecture remains in communication with memory and a display via a bus.

17. The apparatus of claim 15, wherein the driver controls the parallel processing architecture for ray tracing.

18. The apparatus of claim 15, wherein the driver controls the parallel processing architecture for bounding volume traversal.

19. A method, comprising:
- executing at least one node traversal operation and at least one primitive intersection operation, utilizing a parallel processing architecture;
- postponing the execution of the at least one primitive intersection operation, utilizing a buffer; and
- retrieving a node from the buffer;
- wherein a counter is increased by one and it is determined whether the counter is equal to a number of primitives in the node;
- wherein if it is determined that the counter is equal to the number of primitives in the node, the node is removed from the buffer and the counter is set to zero.

20. A computer program product embodied on a computer readable medium, comprising:
- computer code for executing at least one node traversal operation and at least one primitive intersection operation, utilizing a parallel processing architecture;
- computer code for postponing the execution of the at least one primitive intersection operation, utilizing a buffer;
- computer code for retrieving a node from the buffer; and
- computer code for determining whether a distance from an origin of a ray to the node is less than or equal to a length of the ray from the origin of the ray to an end of the ray;
- wherein the computer program product is operable such that the node is removed from the buffer, if it is determined that the distance from the origin of the ray to the node is greater than the length of the ray.

21. A computer program product embodied on a computer readable medium, comprising:
- computer code for executing at least one node traversal operation and at least one primitive intersection operation, utilizing a parallel processing architecture;
- computer code for postponing the execution of the at least one primitive intersection operation, utilizing a buffer;
- computer code for retrieving a node from the buffer; and
- computer code for determining whether a distance from an origin of a ray to the node is less than or equal to a length of the ray from the origin of the ray to an end of the ray;
- wherein the computer program product is operable such that the ray is shortened, if it is determined that the distance from the origin of the ray to the node is less than or equal to the length of the ray.

22. A computer program product embodied on a computer readable medium, comprising:
- computer code for executing at least one node traversal operation and at least one primitive intersection operation, utilizing a parallel processing architecture;
- computer code for postponing the execution of the at least one primitive intersection operation, utilizing a buffer; and
- computer code for retrieving a node from the buffer;
- wherein the computer program product is operable such that a counter is increased by one and it is determined whether the counter is equal to a number of primitives in the node;
- wherein the computer program product is operable such that if it is determined that the counter is equal to the number of primitives in the node, the node is removed from the buffer and the counter is set to zero.

23. An apparatus, comprising:
- a parallel processing architecture for executing at least one node traversal operation and at least one primitive intersection operation, retrieving a node from a buffer, and determining whether a distance from an origin of a ray to the node is less than or equal to a length of the ray from the origin of the ray to an end of the ray; and
- a driver for postponing the execution of the at least one primitive intersection operation, utilizing the buffer;
- wherein the apparatus is operable such that the node is removed from the buffer, if it is determined that the distance from the origin of the ray to the node is greater than the length of the ray.

24. An apparatus, comprising:
- a parallel processing architecture for executing at least one node traversal operation and at least one primitive intersection operation, retrieving a node from a buffer, and determining whether a distance from an origin of a ray to the node is less than or equal to a length of the ray from the origin of the ray to an end of the ray; and
- a driver for postponing the execution of the at least one primitive intersection operation, utilizing the buffer;
- wherein the apparatus is operable such that the ray is shortened, if it is determined that the distance from the origin of the ray to the node is less than or equal to the length of the ray.

25. An apparatus, comprising:
- a parallel processing architecture for executing at least one node traversal operation and at least one primitive intersection operation, and retrieving a node from a buffer; and
- a driver for postponing the execution of the at least one primitive intersection operation, utilizing the buffer;
- wherein the apparatus is operable such that a counter is increased by one and it is determined whether the counter is equal to a number of primitives in the node;
- wherein the apparatus is operable such that if it is determined that the counter is equal to the number of primitives in the node, the node is removed from the buffer and the counter is set to zero.

* * * * *

UNITED STATES PATENT AND TRADEMARK OFFICE
CERTIFICATE OF CORRECTION

| | | |
|---|---|---|
| PATENT NO. | : 8,059,123 B1 | |
| APPLICATION NO. | : 11/956137 | |
| DATED | : November 15, 2011 | |
| INVENTOR(S) | : Laine et al. | |

It is certified that error appears in the above-identified patent and that said Letters Patent is hereby corrected as shown below:

On the title page in the Abstract (57):
 Line 3; please replace "In operation, at, least" with --In operation, at least--.

In the claims:
 Claim 12, col. 12, line 5; please insert --least-- before "one" and after "at".

Signed and Sealed this
Thirteenth Day of March, 2012

David J. Kappos
*Director of the United States Patent and Trademark Office*